United States Patent [19]
Fritsch

[11] Patent Number: 4,686,088
[45] Date of Patent: Aug. 11, 1987

[54] APPARATUS FOR PRODUCING LONG-CHAIN POLYMERS, ESPECIALLY POLYESTERS

[76] Inventor: Rudolf P. Fritsch, Goslarer Str. 58, D-7000 Stuttgart 31, Fed. Rep. of Germany

[21] Appl. No.: 849,571

[22] Filed: Apr. 8, 1986

[30] Foreign Application Priority Data

Apr. 16, 1985 [DE] Fed. Rep. of Germany ....... 3513536

[51] Int. Cl.⁴ .......................... B01F 7/26; B01J 14/00
[52] U.S. Cl. ..................................... 422/135; 159/2.2; 366/85; 366/201; 422/134; 422/229
[58] Field of Search ............... 422/131, 135, 137, 138, 422/225, 229; 425/204; 159/2.2; 366/85, 301

[56] References Cited

U.S. PATENT DOCUMENTS

| | | | |
|---|---|---|---|
| 2,563,396 | 8/1951 | Columbo | 425/204 |
| 2,750,161 | 6/1956 | Simmons | 366/301 |
| 2,942,294 | 6/1960 | Reiferhauser | 425/204 |
| 3,442,065 | 5/1969 | Foras | 159/2.2 |
| 4,040,607 | 8/1977 | Ullrich | 366/85 |

FOREIGN PATENT DOCUMENTS 3030541 2/1982 Fed. Rep. of Germany .

*Primary Examiner*—Michael S. Marcus
*Attorney, Agent, or Firm*—Frishauf, Holtz, Goodman & Woodward

[57] ABSTRACT

An apparatus for the production of long-chain polymers, especially polyesters, is designed with several shafts arranged vertically in ring fashion inside a common housing, with parallel axes and driven in equal direction, each of which carries a number of disk-shaped processing elements arranged axially in a row and in parallel planes, with which adjacent shafts mesh, leaving narrow gaps of predetermined width. These processing elements together with the shafts enclose at least one cavity that is under negative pressure and in whose area the processing elements are arranged in such a way that their circumferential surfaces are exposed. To allow for the processing of material that forms a foam during expansion, the arrangement is designed in such a way that the housing has a tubular housing liner surrounding the shafts which with its cylindrical inner wall reaches tangentially to the circumferential surfaces of the processing elements of the shafts, leaving open a narrow gap of defined width, and which is rotatably mounted onto two coaxial stationary housing sections that seal and close off the ends of the housing liner. The housing liner is coupled with a drive arrangement that provides it with an oscillating rotational movement.

9 Claims, 5 Drawing Figures

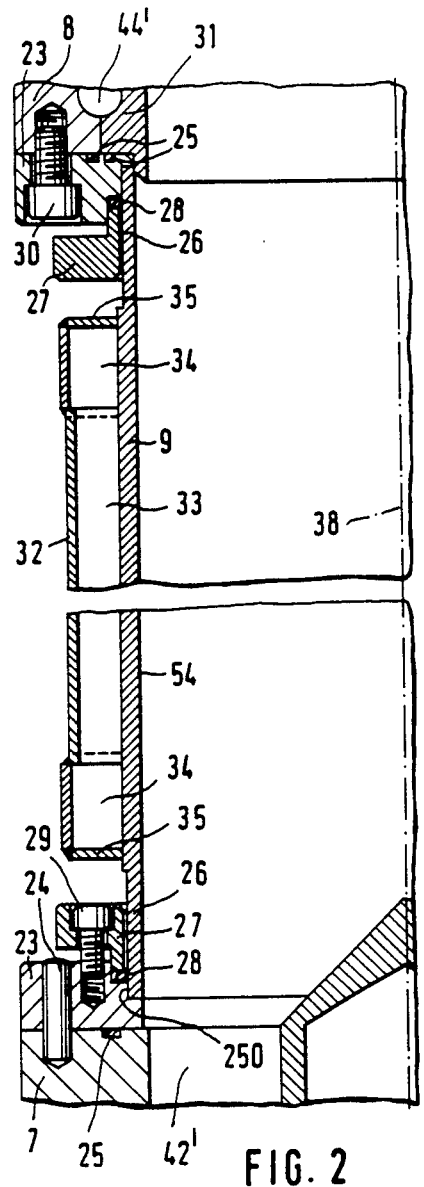
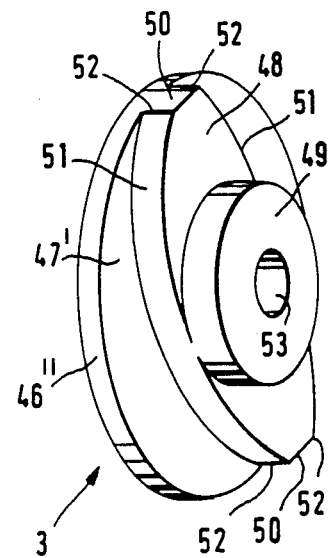
FIG. 2
FIG. 3

APPARATUS FOR PRODUCING LONG-CHAIN POLYMERS, ESPECIALLY POLYESTERS

The invention relates to an apparatus for producing longchain polymers, especially polyesters.

BACKGROUND

It has been known to provide an apparatus of this type with several shafts arranged vertically in ring fashion in a common housing, with parallel axes and driven in equal direction. Each shaft carries a number of disk-shaped processing elements arranged axially in a row located in parallel planes, meshing with adjacent elements on adjacent shafts, forming narrow clearances of predetermined width and enclosing together with the shafts at least one cavity. A negative pressure is applied to the cavity. The processing elements are arranged in such a manner that their circumferential surfaces are exposed to the cavity. The shafts, which are rotatably mounted inside the housing, are formed with arrangements for the intake and discharge of material at their ends.

One such apparatus for the continuous production of longchain polymers is known from German Patent No. 30 30 541 by the applicant of this application, where the shafts carrying the disk-shaped processing elements are partly arranged in tub-shaped recesses of the housing wall which is formed by a rosette-shaped housing liner in whose tub-shaped recesses the processing elements of each shaft mesh with very narrow play. Into the space between the housing liner and the processing elements, flowable material fed into the apparatus is continuously conveyed in the form of thin layers through the narrow gaps between the meshing processing elements into the cavity that is connected to a source of negative pressure. Thus the material is being thoroughly mixed and kneaded while on the other hand it is presented due to the negative pressure in the cavity only in the form of defined thin layers which are continuously renewed. With progressive polymerization the negative pressure helps to remove the residual gas.

Many monomer mixtures are brought to polymerization temperature prior to polymerization while under pressure, being simultaneously mixed, for example in static mixers. This applies for example to the polycondensation of polyester.

When this heated mixture is conveyed by means of heated metering pumps into a reaction chamber, the mixture is expanded which leads to the formation of a voluminous foam. Since the known apparatus has no vacant spaces between the tub-shaped recesses of the rosette-shaped housing liner and the shafts or between the recesses and the partly surrounded processing elements, where the foam could expand, the known apparatus cannot be used for the processing of such materials.

Since the processed material is locally subjected to a very high degree of shearing stress—an undesirable feature for sensitive materials—in the area of the narrow gap between the outer circumferential surfaces of the processing elements and the adjacent wall of the tub-shaped recesses surrounding the processing elements on the side opposite the cavity, it has been suggested (in German Patent Disclosure Document DE-OS No. 34 30 885, to which PCT application No. 85/00283, now U.S. application Ser. No. 871,422, filed Mar. 31, 1986, by the inventor of this application, corresponds) to arrange the apparatus in such a way that over at least part of the length of the shafts the circumferential surfaces of the processing elements are exposed also on the outer side facing away from the cavity.

While this provides sufficient space for accommodating the voluminous foam between the inner wall of the housing liner and the processing elements and shafts, this foam has a tendency to adhere very tightly to the housing liner as well as to the processing elements. This means that the material to be processed would quickly burn on or sinter to the heated inner wall of the housing liner and thus contaminate the end product.

THE INVENTION

It is an object to provide an apparatus of the type referred to above for the production of polymers in which on the one hand sufficient free space is available in the reaction chamber, formed between the inner wall of the housing liner and the shafts and their processing elements arranged in ring distribution, for accommodating the material to be processed in the form of voluminous foam, and in which on the other hand the constant adhesion or sintering or burning on of the material to the inner wall of the housing liner is automatically prevented.

Briefly, the housing contains a tubular liner which surrounds the shafts and whose cylindrical inner wall—leaving a narrow gap of predetermined width—tangentially reaches up to the circumferential surfaces of the processing elements of the shafts and is rotatably mounted on two coaxial, stationary housing sections whose sealed end faces encapsule the liner which is coupled with a driving arrangement that provides it with an oscillating rotational movement.

When with this apparatus the heated monomer mixture is fed into the reaction chamber between the shafts and/or the processing elements by means of heated metering pumps at the feeding points provided for at each shaft, sufficient gusset-like spaces of roughly triangular cross-section are available between the processing elements and the inner wall of the housing liner—running tangentially to the circumferential surfaces of the processing elements—to accommodate the voluminous foam that is formed when the mixture expands. This foam adheres to the processing elements and is carried along by the shafts because these rotate in equal direction. But since the gas bubbles contained in the foam cannot get through the narrow gap between the meshing processing elements (the gap is approximately 0.5 mm wide), they are mechanically destroyed by the counteracting processing elements. However, the gas that is released can escape through the gap into the cavity that is under negative pressure and that is surrounded by the processing elements and outside by the thin layer of material continuously conveyed by the processing elements. The gas is drawn off from the negative pressure chamber.

As the monomer mixture expands in the reaction chamber, it undergoes a rapid drop in temperature which causes the depressurization of the gas bubbles that actually makes degasification more difficult. In spite of this, the gas bubbles are destroyed as described above because the material to be processed in the apparatus is continuously spread into thin layers which facilitate the removal of even very small bubbles.

As the material moves through the narrow gap, it is thoroughly mixed which at the same time, results in polymerization, or polycondensation. Since the narrow gaps between the two meshing processing elements are filled with the thin layers of the material, the monomer reaction chamber is sealed off from the negative pressure chamber by these thin layers, and only the released gas can escape into the negative pressure chamber.

The inner wall of the tubular housing liner only approaches the circumferential surface of the processing elements to a distance equalling the width of the gap and only in a very short section in circumferential direction. This on the one hand eliminates the excessive shearing stress of the material between the processing elements and the housing liner, on the other hand the material is also spread through this gap which has roughly the same width as the gap between the processing elements (0.5 mm) into a very thin layer, which causes more gas bubbles to be destroyed.

Due to the oscillating rotational movement of the housing liner in relation to the shafts, the material adhering to the inner wall in the region of the spaces between the shafts and/or processing elements is constantly scraped off and renewed which ensures that no material can adhere or burn on or sinter to the inner wall of the liner for a long time. This constant "surface renewal" in the entire reaction chamber, where no stationary surfaces are provided for the material, ensures a highly transparent end product in addition to a very close distribution of molecular weights and thus ensures a high quality since, as already explained, the material is constantly subject to intensive mixing during polymerization or polycondensation as it moves through the narrow gaps of the processing elements.

Preferably the stroke of the oscillating movement of the tubular housing liner equals 360 degrees divided by the number of shafts. The length of this stroke definitely prevents—regardless of the structural details of the apparatus—all residual "dead zones" on the inner wall of the housing liner.

Depending on the type of material to be processed, the housing liner itself can be heated. This is a particulary simple solution when the liner is at least in some sections designed with double walls through which a heat carrier is conducted.

Furthermore, the shafts and/or processing elements can be temperature controlled. In that way the relatively large heated surface of the processing elements can be designed to rapidly compensate adjust for the drop in temperature that occurs when the monomer mixture is fed into the reaction chamber, i.e. during expansion, and thus to increase the gas pressure in the bubbles. This is an advantage as far as degasification is concerned. Once the polymerization temperature has increased so much that a temperature gradient exists between the material for processing and the shafts or processing elements, the excess polymerization heat is removed via the controllable processing elements or shafts. This facilitates the very accurate temperature control of the polymerization or polycondensation process.

It is preferable to seal the housing liner against stationary housing sections by means of adjustable sealing arrangements in the manner of a stuffing-box which provide acceptable sealing performance even during long-term operation. In this way it is possible to maintain a high vacuum in the negative pressure chamber in the magnitude of 1 tor.

DRAWINGS

FIG. 2 shows the housing of the arrangement according to FIG. 1, seen in a section along line I—I in FIG. 4, in lateral view, in detail and drawn to another scale.

FIG. 3 shows a processing element of the arrangement according to FIG. 1, shown in perspective view and drawn to another scale.

DETAILED DESCRIPTION

Figure 1:
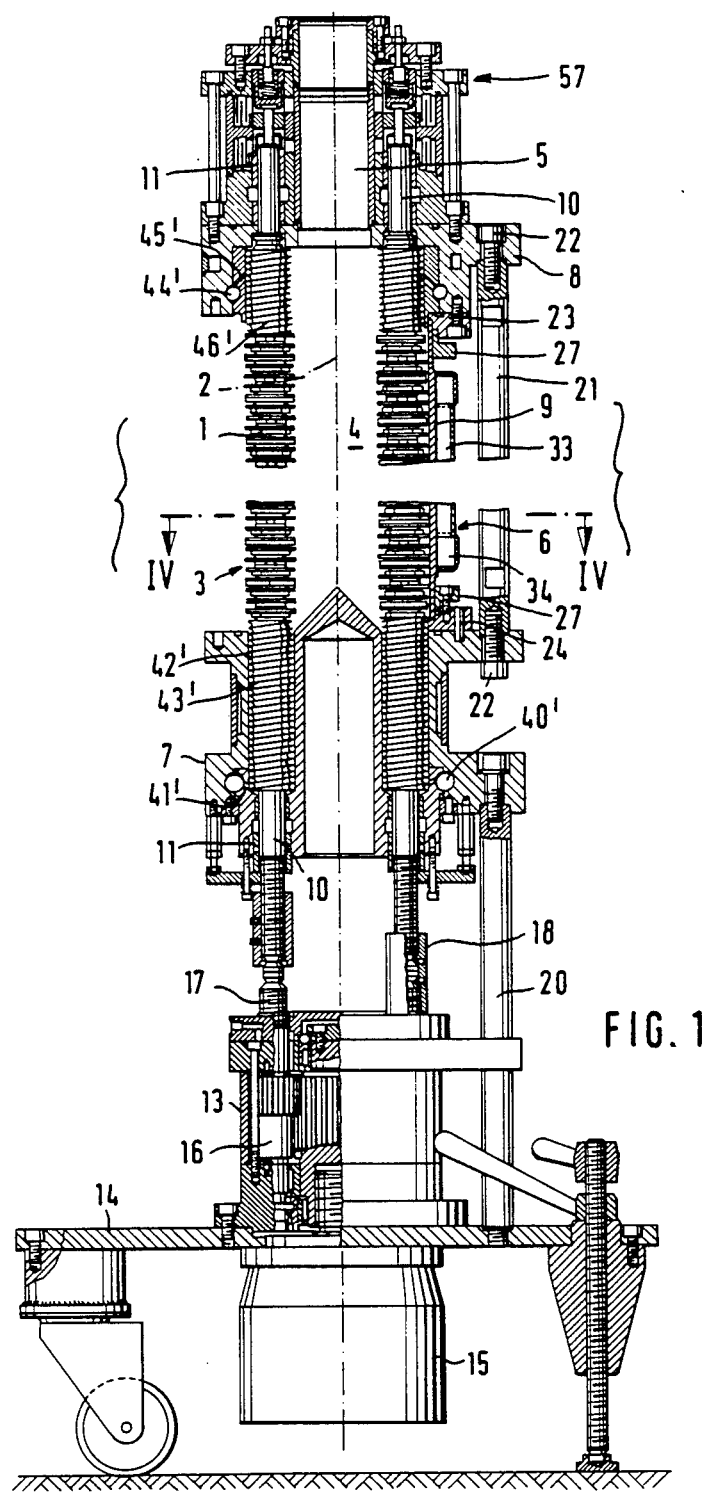
FIG. 1 shows an arrangement according to the invention, seen in a section along line I—I of FIG. 4, in a lateral view, omitting the housing liner to the left of the centre line.

The apparatus shown in the figures for the production of long-chain polymers, especially polyester, comprises ten vertically arranged shafts 1 whose parallel axes 2 lie on a common imaginary circular cylinder, which are arranged in ring fashion and each of which carries a fairly large number of disk-shaped processing elements 3 (FIG. 3) arranged axially in a row and in parallel planes. Their design can be seen in detail in FIG. 3. These disk-shaped processing elements 3 mesh with adjacent shafts 1, forming narrow gaps 55 whose predetermined width is about 0.5 mm (see FIG. 4). Together with shafts 1 the processing elements 3 enclose a cavity 4 which is connected with a negative pressure source (not shown in detail) via a suction stub 5.

The shafts 1 are enclosed by a housing 6 consisting of two stationary, disk-shaped housing sections 7,8 and a tubular, cylindrical housing liner 9 whose ends are sealed by housing sections 7,8. Shafts 1 are sealed and rotatably mounted by means of cylindrical shaft journals 10 in assigned drill holes 11 of housing sections 7,8, and the associated shaft seals are designed in such a way that air or contaminants cannot enter the space enclosed by housing liner 9.

Lower housing section 6 of housing 7 is mounted on a coaxial gear box 13 which in turn is arranged on a carriage 14 to which a motor 15 is attached. Gear box 13 houses a gear drive 16 driven by motor 15. Gear drive 16 has ten drive shaft journals 17 assigned to the different shafts 1 and arranged parallel to their axes; each of the drive shaft journals 17 is non-rotatably connected with an associated shaft journal 10 via a coupling sleeve 18. Gear drive 16 is designed in such a way that motor 15 provides shafts 1 with equal rotational movement of equal speed whose rotational direction is indicated by arrows 19 in FIG. 4. Supports 20 rigidly connect the lower housing section 7 with gear box 13 and carriage 14 in a non-rotatable manner.

The two housing sections 7,8 are held at a predetermined, exactly defined distance by means of columns 21 arranged axially parallel around the sections 7,8; at their faces columns 21 are bolted to housing sections 7,8 at 22, and sections 7,8 are non-rotatably connected with each other.

Especially FIG. 2 shows that to lower housing section 7 a ring bearing 23 is bolted, pinned non-rotatably to the housing section 7 at 24 and sealed hermetically against housing section 7 by means of a gasket 25. Ring bearing 23 has a cylindrical drill hole 250 coaxially to housing section 7 into which the cylindrical housing liner 9 is inserted rotatably and with little play by means of a cylindrical attachment 26. This attachment 26 is surrounded by a thrust ring 27 that presses upon a ring gasket 28 arranged in an associated ring slot and that is axially braced against ring bearing 23 by means of screw bolts 29 evenly distributed along its circumference.

Thrust ring 27 and ring bearing 23 together with ring gasket 28 form a sealing arrangement in the manner of a stuffing-box for housing liner 9 that can be adjusted if necessary by means of the screw bolts 29 and that ensure that the rotatable housing liner 9 is hermetically sealed against housing section 7.

An analogous adjustable sealing arrangement in the manner of a stuffing-box is provided on the opposite side to seal liner 9 hermetically against the upper housing section 8. Equal parts are shown with the same reference numbers, so that it is unnecessary to explain them again. One of the ring bearings 23 with the housing section 8 (the same as with 7) connected by the screw bolt is shown at 30; in contrast to the lower sealing arrangement, two gaskets 25 are provided here that fit into each other because in a central drill hole of the upper housing section 8 a bushing 31 is provided that must be sealed as well.

Figure 5:
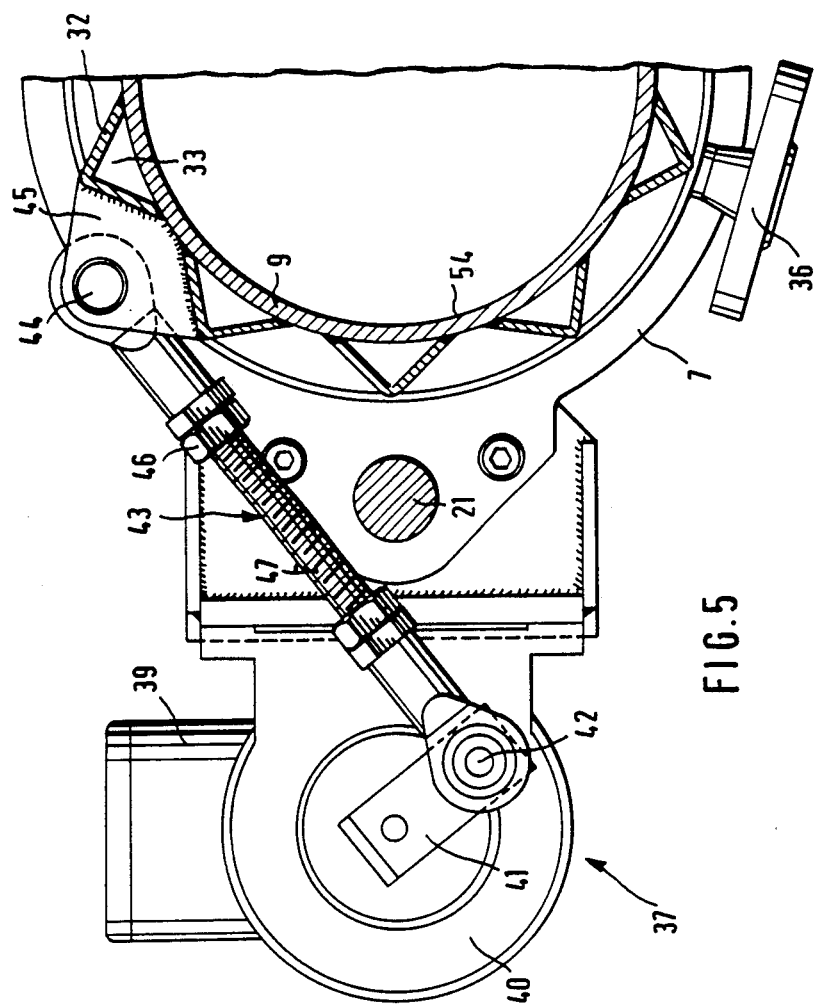
FIG. 5 shows the housing of the arrangement according to FIG. 1, drawn in section according to FIG. 4, showing greater detail of the associated driving mechanism.

The cylindrical housing liner 9 which can, for example, be made of high-grade steel, can be heated. For this purpose it is designed in some sections with double walls, but it could also be designed with double walls throughout. On its outside it carries parallel angle brackets 32 which are welded on at intervals which together with the housing liner 9 enclose heating chambers 33 whose ends open into ring-shaped ring chambers 34 which in turn are sealed and closed by ring-shaped end plates 35. Through the heating chambers 33 and the ring chambers 34 flows a heat carrying medium such as thermo-oil which is led in and out via appropriate connections for flexible feeder lines opening into ring chambers 34; one of the connections is shown in FIG. 5 at 36.

By regulating the temperature of this heat carrier medium appropriately, the heating temperature of the housing liner 9 can be held exactly at a predetermined rate or controlled in accordance with a predetermined program.

In accordance with a feature of the invention, the housing liner 9, mounted rotatably within the two ring bearings 23 in the described manners is connected with a drive arrangement 37 (shown in detail in FIG. 5) which provides it with an oscillating movement about its central axis 38.

The drive arrangement 37 has a crank arm 41 driven by a motor 39 and rotatably mounted in a bearing block 40 flange-connected with the lower housing section 7; the crank arm 41 has a crankpin 42 coupled by means of a connecting rod 43 with a journal 44 which is non-rotatably connected with housing liner 9 via a welded-on bearing part 45. The length of connecting rod 43 can be changed by means of adjusting nuts 46 and a threaded coupling 47.

In the lower housing section 7 a coaxial ring channel 40' is formed which together with an output line connection leading outside, and not shown in detail in FIG. 1, forms a part of a material output arrangement. From it 10 branch channels 41' originate, each of which opens into a cylindrical drill hole 42' that is coaxial to the associated drill hole 11; in this cylindrical drill hole 42' a conveyor auger 43 rotates with little play. It is fitted onto the shaft 1.

In analogous fashion, in the upper housing section 8 and in the bushing 31 inserted into same is an input line connection also not shown in FIG. 1 and a ring channel 44' (see FIG. 2) forming part of the material input arrangement, from which for each shaft one branch channel 45' originates which leads to the periphery of a conveyor screw 46' on shaft 1 and which either abuts with clearance on an appropriate tub-shaped recess of bushing 31 or is completely surrounded with clearance by an appropriate cylindrical drillhole in the area of bushing 31.

The conveyor screws 46,43 are designed in such a way that they convey incoming flowable material from above to below (in terms of FIG. 1).

Figure 4:
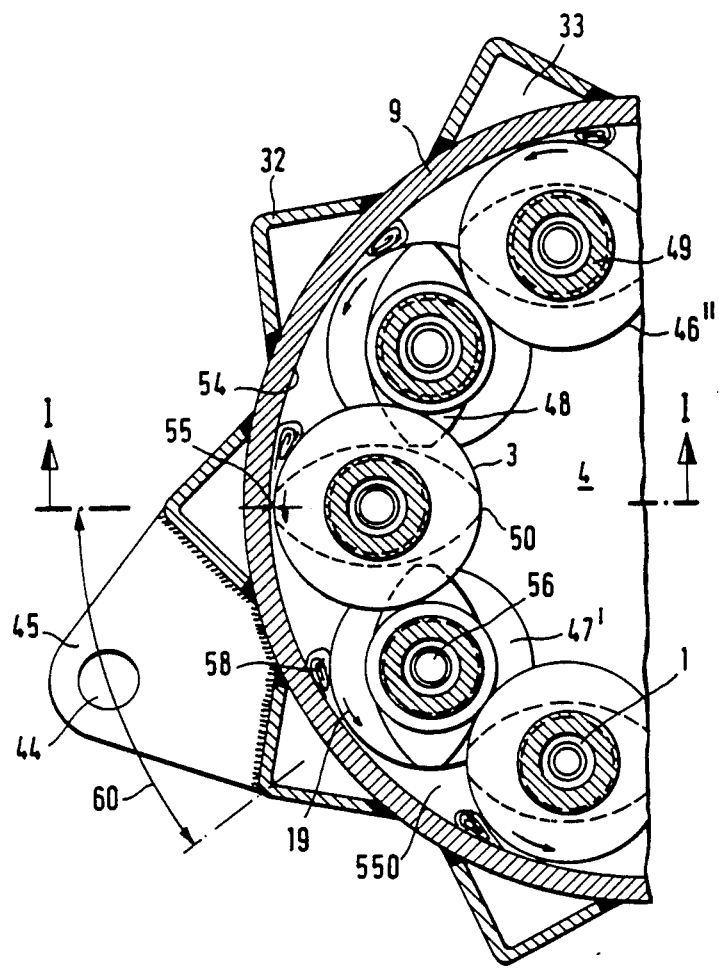
FIG. 4 shows the arrangement according to FIG. 1 in a section along line IV—IV of FIG. 1, drawn in top view, in detail, and to another scale.

The basic design of the processing elements 3 on shafts 1 is shown in particular in FIGS. 3,4. Their functional details are explained in the earlier patent application U.S. Ser. No. 871,422, filed Mar. 31, 1986, by the inventor hereof.

Each processing element 3 has a circular disk-shaped part 46' with two juxtaposed plane surfaces 47', an also disk-shaped, largely oval part 48 that is coaxial to the above, and an also coaxial spacing washer 49. The disk-shaped part 48 which is as thick as or preferably somewhat thicker than disk-shaped part 46' approaches, with two circular circumferential surface sections 50 the circumferential surface of the circular disk-shaped part 46'. The two circular circumferential surface sections 50 are connected with each other by arc-shaped circumferential surface sections 51 which resemble each other, so that in a top view a roughly oval disk is seen that has corners 52. A hub bore 53 serves to hold processing elements 3 non-rotatably on the cylindrical shaft 1.

At least some of the described processing elements can be—depending on the material to be processed—replaced in a modified design by circular disk-shaped processing elements, eliminating the oval disk-shaped parts 48. It is also conceivable to design them in such a way that sections of the processing elements 3 shown in FIG. 1 alternate with sections of purely disk-shaped processing elements or that individual circular disk-shaped processing elements are inserted between sections of successive processing elements 3 according to FIG. 3.

In any case the processing elements always mesh as is shown particularly clearly in FIG. 4 in such a way that narrow gaps of predetermined width are formed between the face and circumferential surfaces of all interacting parts of the procesing elements.

As shown in particular in FIG. 4, the arrangement is designed in such a way that the tubular housing liner 9 reaches to the cylindrical circumferential surface of the processing elements 3 with its cylindrical inner wall 54, leaving a narrow gap 55. The width of gap 55 is about 0.5 mm, which is approximately the same as the width of the above mentioned gaps between the processing elements 3. Thus the inner wall 54 of the housing liner 9 reaches tangentially to the circular cylindrical circumferential surfaces of the processing elements 3, and—seen in cross section—largely triangular gusset-like open spaces 550 are formed by the inner wall 54 and the circumferential surfaces of the processing elements 3 of adjacent shafts 1.

Operation:

The material to be processed, a monomer mixture having the required polymerization of polycondensation temperature, is fed under pressure via the ring channel 44 and the branch channels 45 to the conveyor screws 46 of each shaft 1. The negative pressure chamber 4 is connected to a negative pressure source that maintains a negative pressure, such as 1 tor, in the pressure chamber. Through heating chambers 33 and ring chambers 34 flows a heated heat carrier medium. The same applies to shafts 1 which are designed as hollow shafts, whose longitudinal drill bores are shown at 56 in FIG. 4 and whose heat carrier supply arrangement is shown schematically as 57 in FIG. 1.

The material for processing conveyed by the conveyor screws 46 is moved into the reaction chamber formed by the inner wall 54 and the meshing processing elements 3 of shafts 1, while the monomer mixture expands in the above explained open spaces 550 and forms a voluminous foam. This foam adheres to the processing elements 3 and is carried along by them. The material is spread between the meshing processing elements 3 into thin layers, while the gas bubbles contained in the foam are mechanically destroyed because they are unable to penetrate the narrow gaps. However, the released gas escapes through the gaps into negative pressure chamber 4 enclosed by shafts 1, from where it is removed.

As the processing progresses, the material that is thoroughly mixed between the processing elements 3 and constantly spread into thin layers while it is progressively polymerized or polycondensated is moved down along shafts 1 and forms a thin layer on processing elements 3 on the side facing the negative pressure chamber 4, while on the side facing open spaces 550 the foam-like material forms a thick layer.

Finally the material reaches the lower conveyor screws 43 from where it is transported via the branch channels 41 into the ring channel 40 and on to a further processing station.

Since the cylindrical inner wall 54 of the housing liner 9 also encloses a narrow gap 55 with the circular cylindrical circumferential surface of the disk-shaped parts 46 and the circumferential surface sections 50 of disk-shaped parts 48 of the processing elements 3, the material is conveyed through this gap, too, in the form of thin layers, while the material is also thoroughly mixed and the gas bubbles are destroyed. In FIG. 4 it is indicated schematically at 58 how the material accumulates at the entrance of this conically widening "wall gap" as the result of the movement of the processing elements 3.

To avoid the permanent or long-term solid adherence of the material in thick layers to the inner wall 54 of the housing in the area of the open spaces 55 which would cause thermal damage, or that it burns on or sinters to inner wall 54, the housing liner 3, driven by drive arrangement 37, performs an oscillating movement whose stroke is shown by arrow 60 in FIG. 4. The magnitude of this stroke depends somewhat on the type of the material to be processed. It equals at least 360 degrees divided by the number of shafts 1.

In this way it can be ensured that the material adhering to the inner wall 54 in the open spaces 550 is constantly scraped off the inner wall 54 by the processing elements 3 and is thus always renewed. Thus it is impossible for the material to stick to inner wall 54.

When the polymerization temperature has risen so high that a temperature gradient exists between the material for processing and shafts 1, the excess polymerization heat is removed via shafts 1, i.e. via the heat carrier flowing inside them.

I claim:

1. Apparatus for producing long-chain polymers, especially polyesters, having several shafts (1) arranged vertically and located in ring distribution inside a common housing (6, 7, 8, 9),
    said shafts having parallel axes and being driven in a common direction,
    a plurality of disk-shaped processing elements (3) carried by respective shafts, and arranged axially in a row and in parallel planes,
    the elements of adjacent shafts being intermeshed while leaving narrow gaps of predetermined width and enclosing at least one cavity (4) which cavity is under negative pressure, the processing elements being so positioned and arranged that their circumferential surfaces are exposed to the cavity,
    the shafts (1) being rotatably mounted in the housing; and
    material input (44') and output (40') arrangements formed in the housing, wherein
    the housing (6) comprises
    a tubular housing liner (9) surrounding the shafts (1) and having a cylindrical inner wall (54) extending tangentially to circumferential surfaces of the processing elements (3) on the shafts (1) and leaving a narrow gap (55) of defined width;
    two coaxial stationary housing sections (7, 8) located at respective ends of the tubular housing liner, and sealing and closing off the ends of the housing liner (9); and
    a drive arrangement (37) providing an oscillating rotational movement coupled to the housing liner (9) and rotatably oscillating the housing liner.

2. Apparatus according to claim 1, wherein the stroke (60) of the oscillating drive equals at least 360 degrees divided by the number of shafts (1).

3. Apparatus according to claim 1, wherein the housing liner (9) further includes heating means.

4. Apparatus according to claim 3, wherein the housing liner (9) is formed with sections that have double walls through which a heat carrier can flow.

5. Apparatus according to claim 1, wherein the shafts (1) are temperature-controlled.

6. Apparatus according to claim 1, wherein the processing elements (3) are temperature-controlled.

7. Apparatus according to claim 6, wherein the shafts (1) are temperature-controlled.

8. Apparatus according to claim 1, wherein the housing liner (9) is sealed against the stationary housing sections (7, 8) by means of adjustable sealing devices (23, 27, 28).

9. Apparatus according to claim 8, wherein the adjustable sealing devices (23, 27, 28) comprise stuffing boxes.

* * * * *